United States Patent
Chang et al.

[19]

[11] Patent Number: 6,108,846
[45] Date of Patent: Aug. 29, 2000

[54] CLEANING APPARATUS FOR WHEELS OF CAR, FOR SEMICONDUCTOR DEVICE MANUFACTURING

[75] Inventors: Nick Chang, Hsin Chu; Chung-Yea Lee, Chu-Pei, both of Taiwan

[73] Assignee: Taiwan Semiconductor Manufacturing Company, Hsin-Chu, Taiwan

[21] Appl. No.: 09/213,457

[22] Filed: Dec. 17, 1998

Related U.S. Application Data

[62] Division of application No. 08/668,712, Jun. 24, 1996, Pat. No. 5,849,096.

[51] Int. Cl.[7] .................. B60S 1/66; B60S 1/68; B08B 1/02; B08B 5/04
[52] U.S. Cl. .................. 15/3; 15/53.4; 15/88.2; 15/97.3; 15/301; 15/311
[58] Field of Search .................. 15/3, 53.1, 53.3, 15/53.4, 88.2, 97.3, 301, 311, 97.1

[56] References Cited

U.S. PATENT DOCUMENTS

| | | | |
|---|---|---|---|
| 3,708,818 | 1/1973 | Hotz | 15/97.1 |
| 4,233,703 | 11/1980 | Clyne et al. | 15/53.4 |
| 4,272,301 | 6/1981 | Galbraith et al. | 134/8 |
| 5,261,433 | 11/1993 | Smith . | |
| 5,264,374 | 11/1993 | Watanabe et al. . | |
| 5,349,714 | 9/1994 | Korbonski et al. | 15/3 |
| 5,860,180 | 1/1999 | Heise | 15/53.4 |
| 5,933,902 | 8/1999 | Frey | 15/102 |

FOREIGN PATENT DOCUMENTS

| | | |
|---|---|---|
| 919914 | 4/1982 | U.S.S.R. . |
| 2147859 | 5/1985 | United Kingdom . |

*Primary Examiner*—Robert J. Warden, Sr.
*Assistant Examiner*—Kaj K. Olsen
*Attorney, Agent, or Firm*—George O. Saile; Stephen B. Ackerman; William S. Robertson

[57] ABSTRACT

Cleaning apparatus for the wheels of a car used in a semiconductor manufacturing plant has a pair of endless belts that carry a dust trapping material on their outer surfaces. The belts turn against a wheel and thereby remove the dust.

11 Claims, 2 Drawing Sheets

CLEANING APPARATUS FOR WHEELS OF CAR, FOR SEMICONDUCTOR DEVICE MANUFACTURING

This is a division of patent application Ser. No. 08/668,712, filing date Jun. 24, 1996, Cleaning Apparatus For Wheels Of Car, For Semiconductor Device Manufacturing, now U.S. Pat. No. 5,849,096 assigned to the same assignee as the present invention.

FIELD OF THE INVENTION

This invention relates generally to apparatus for use in manufacturing semiconductor devices. More specifically, it relates to apparatus for cleaning the wheels of a car that transports semiconductor devices during manufacturing.

INTRODUCTION

It is a familiar problem in manufacturing semiconductor devices that the devices and the manufacturing apparatus must be kept clean. As a relevant example, wheeled vehicles, called cars, are used for carrying semiconductor devices and associated apparatus between stations in a manufacturing plant. The cars, like other manufacturing apparatus, must be kept clean. More specifically, the wheels tend to collect dust and it is a common practice to clean the wheels to remove the dust.

Commonly, these cars are pushed by a human operator and such a car will be the simplest example for understanding the invention. However, the invention will be useful with cars having various degrees of automation.

THE PRIOR ART

In one prior art technique for cleaning the wheels of a car, the car is rolled across a sticky mat. Dust on the wheel treads stick to the mat and is thereby removed from the wheels. One problem with the sticky mat is that the car usually follows the 30 same path and this part of the mat becomes quickly filled with dust. Commonly, the mat must be replaced once or twice a day at a significant cost in labor.

U.S. Pat. No. 5,261,433 teaches an apparatus for washing the wheels of a vehicle.

SUMMARY OF THE INVENTION

A general object of this invention is to provide a new and improved apparatus for cleaning a wheel. A more specific object is to provide a new and improved apparatus for removing dust particles from the tread of the wheels of a car used in semiconductor manufacturing.

The cleaning apparatus of this invention has a support that the car rolls onto for cleaning. The support is an extension of the surface the car otherwise rides along. Other components of the cleaning apparatus are attached to the support. is The apparatus cleans the two front wheels of the car and then cleans the two rear wheels. (As with most wheeled vehicles of this general type, the car has two coaxial front wheels and two coaxial rear wheels and pairs of wheels have substantially the same side to side spacing.)

Two pairs of rollers, one pair for each of the two wheels being cleaned together, are attached to the support in a position to receive the two wheels that are to be cleaned. The two rollers for the same wheel are spaced apart an appropriate distance along the path of the car so that each front or rear wheel can be positioned in the gap between its two rollers so as to be supported by both rollers.

Each wheel supporting roller cooperates with an idler roller to carry an endless bolt with a suitable cleaning surface, such as the sticky material used in the form of a mat in the prior art described above. Another material that has been found suitable is a belt with a rough surface made of rubber. One of the belts is driven by an electric motor. The wheel being cleaned turns with the driven belt and it has sufficient frictional engagement with the other belt to turn it.

The belts are removed and cleaned or replaced as necessary. Commonly they are cleaned after a predetermined number of hours of use. One of the objects of the invention is to simplify the operation of changing a belt.

Other objects and features of the invention will appear in the description of a preferred embodiment of the invention: the apparatus is easy and safe to operate; it is easy to maintain; and it is easy to operate manually and it can be made to operate automatically.

THE DRAWING

THE PREFERRED EMBODIMENT

Introduction

Figure 3:
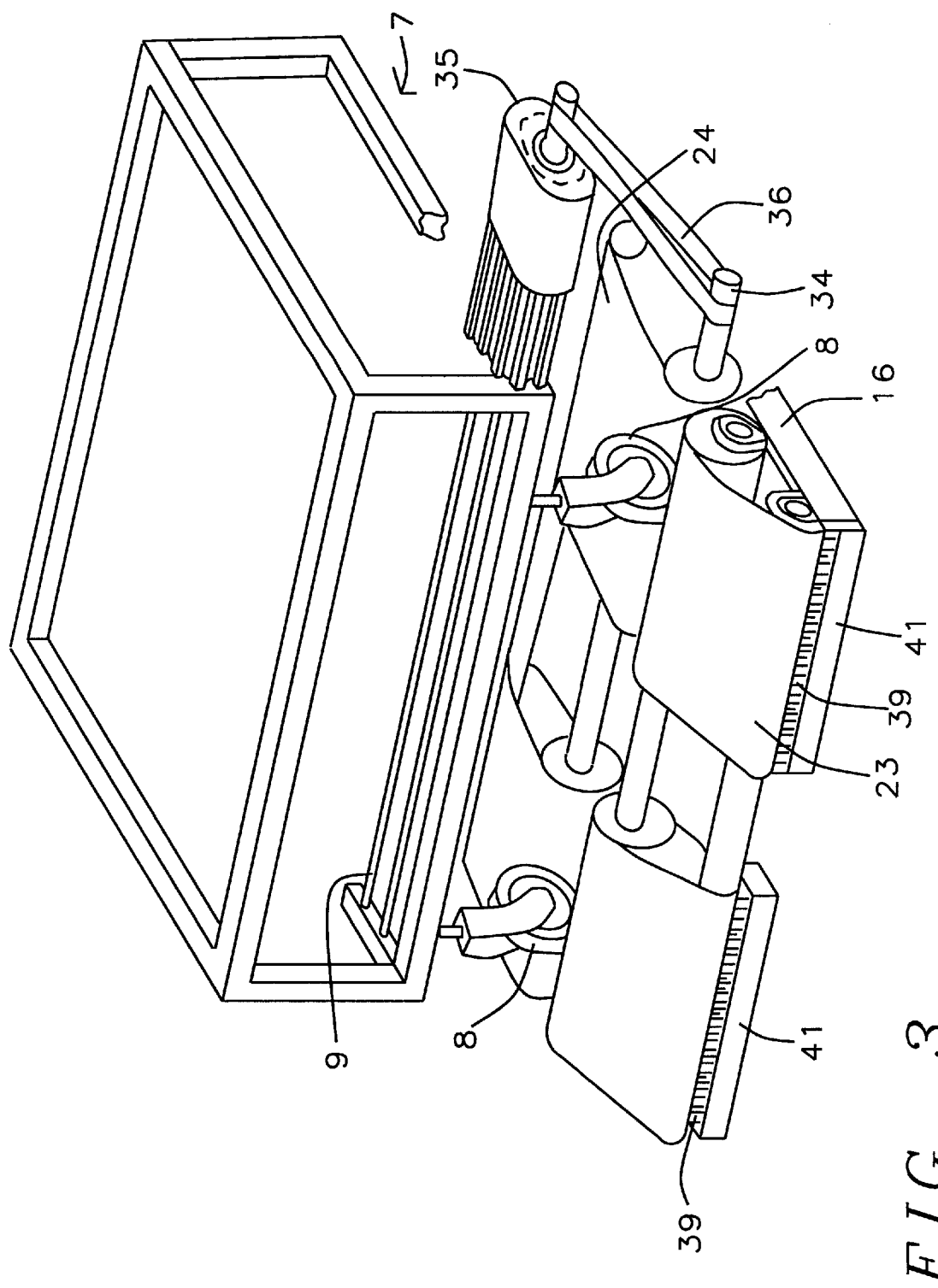
FIG. 3 is an isometric partial view Of the apparatus of FIG. 1 and a car having its wheels cleaned.

FIG. 3 shows a partial view of a car 7 that would be cleaned with the apparatus of this invention. It has a generally open rectangular frame with a pair of wheels 8 located near the front. A similar pair of wheels (not shown) is located at the back. The bottom of the car is formed by rods 9 that support semiconductor components. The car is representative of a variety of cars that can be cleaned with the apparatus of this invention, but details of the car such as rods 9 are optional.

The Car Path at the Cleaning Station

Figure 1:
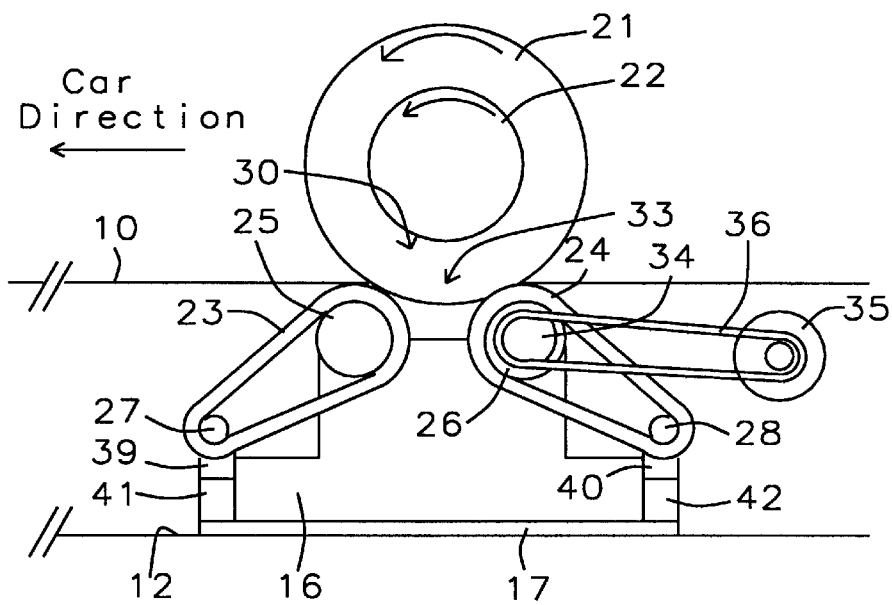
FIG. 1 is a side view of the cleaning apparatus of this invention.

A horizontal line 10 in FIG. 1 denotes the upper surface of a support 11 that the car rolls along as it passes through the cleaning station. ordinarily the path of the car is along a conveyer system, and the upper surface of 10 of support 11 is a continuation of this surface.

The Support Structure of the Cleaning Apparatus

At the cleaning station, a suitable space is provided for locating other components of the apparatus below the surface 10 of support 11. As FIG. 1 shows, the preferred cleaning apparatus is supported on a surface 12 that is preferably about 120 mm below the car path surface 10.

Figure 2:
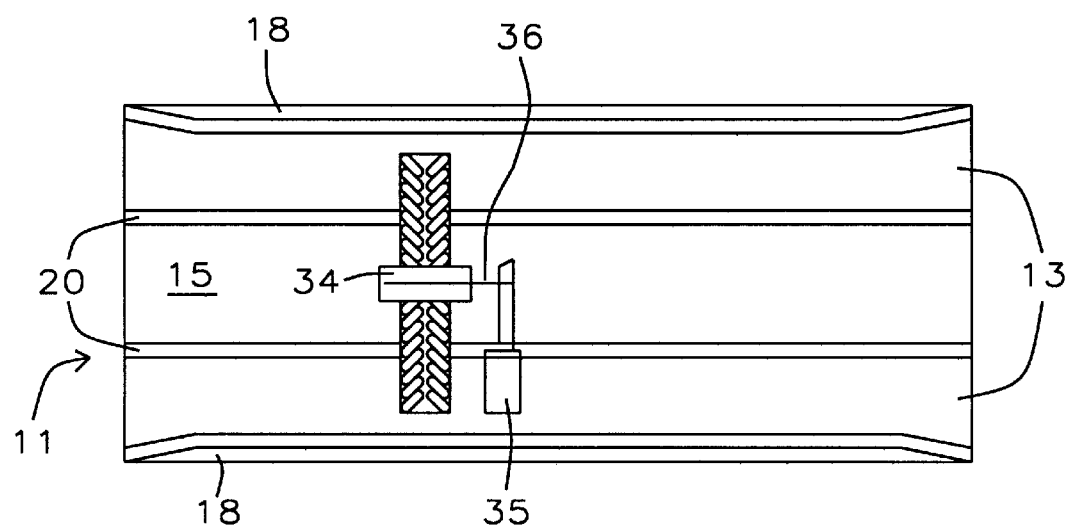
FIG. 2 is a top view of the apparatus of FIG. 1.

As FIG. 2 shows, structure 11 is formed as spaced apart symmetrical right and left path forming elements 13. Elements 13 are spaced apart according to the distance between the front wheels 8 or rear wheels of the car, and they are separated sufficiently to provide an entryway 15 for access to components of the wheel cleaning apparatus by an operator or maintenance person. The entryway may be at the level of surface 12 or it can be made lower. The operator can access components of the cleaning station from one preselected direction or from either direction, depending on the space provided ahead and behind the apparatus.

The car support 11 is attached to a general supporting structure 16. Structure 16 rests on a pad 17 that lies on the floor 12. The pad helps to isolate the car from vibration. Structure 16 is adapted to form an enclosure for establishing a low vacuum near the wheels as part of an air shower, as is conventional for cleaning. Supporting structure 16 uses techniques common for roller and belt structures and will be readily understood from the simplified drawings of FIGS. 1 and 3.

As FIG. 2 shows, guide bars 18 are attached at the outside edges of the right and left path forming elements 13 to assist in keeping the car positioned in the path. As a general indication of the size of the apparatus, the guide bars are about 100 cm apart.

Two strips of marking tape 20 are along the edge of the path, at the side of the operator entryway. The stripes guide the person pushing the car.

The Wheel Tread Cleaning Components

Two circles 21, 22 in FIG. 1 represent the outline of wheels 8 of a range of sizes at the cleaning station. The preferred diameters are 7.8 cm and 10.5 cm. Arcuate arrows show the direction of rotation of the wheels during the cleaning operation.

At the cleaning station, a wheel 8 rides on two endless belts 23, 24 that each have an outer cleaning surface. The belts are supported between upper rollers 25, 26 which are located under the wheels 8 and lower rollers 27, 28. The upper rollers are spaced apart in the direction of the cart path to form a gap 30 that the wheels ride in during the cleaning process. Note that the car rises slightly as the wheels travel over the rear roller and belt and then drop slightly into the gap. (The rise is about 0.3 cm and the drop is about 0.6 cm.)

The upper rollers 25, 26 project slightly above the surface of the track 11, and they have a diameter to provide a suitably smooth ride over the top of the rear roller 26 as a pair of wheels slide into the gap 30. As a specific example, the upper rollers have a diameter of 4.5 cm. The lower rollers 27, 28 have a suitable diameter to carry the belt, preferably 2.0 cm. A light source and photo sensor system 33 is mounted on the enclosure to detect the presence of a wheel in gap 30. The signal from the photo sensor can be used to start the cleaning operation by starting a motor (35 described later) for a timed or otherwise controlled operation, The Drive System for Belts 23, 24

The upper and lower rollers 25–28 are mounted to rotate in structure 16. As FIG. 2 shows, the cleaning apparatus has a separate belt and roller assembly for the right and left wheels 8 and the right and left rollers are interconnected to be rotated together. The details of the mounting structures are conventional and the mounting structures are shown schematically in FIG. 1.

One roller, upper roller 26 in FIG. 1, carries a pulley 34 for being driven from an electric motor 35 through a belt 36. The drive system can be arranged in any suitable way. FIG. 3 shows motor 35, pulley 34 and belt 36 located near the outside of the track 11, and FIG. 2 shows the pulley and belt located in the entryway.

The Belt Cleaning Brush

Two brushes 39, 40 are mounted to scrub dust from the surfaces of the belts. As FIG. 1 shows, a brush is mounted on a support 41 or 42. The supports are removably attached to enclosure 16 and can be removed for cleaning or replacing the brushes.

OTHER EMBODIMENTS

From the description of the preferred embodiment of the invention, those skilled in the art will recognize various modifications within the spirit of the invention and the intended scope of the claims.

What is claimed is:

1. Apparatus for cleaning a wheel of a vehicle such as a car for use in semiconductor manufacturing as as the wheel is rolled into a cleaning position, comprising, first and second strips (23, 24) of a wheel cleaning material, first and second rollers (25, 26) each adapted to carry an associated one of the strips, the rollers being of substantially equal diameter, a support (11) having a surface which is adapted to support the car while the car is moved through the cleaning position, means (16) supporting the first and second rollers at about the level of the support surface supporting the car, the rollers being supported on parallel axes and being spaced apart to form a gap (30) into which two coaxial wheels of a car can be positioned with their circumferential surfaces in contact with the wheel cleaning material, the first and second strips each being in the form of an endless belt, a third roller and a fourth roller cooperating with the first and second rollers respectively to carry the belts, and means for driving the rollers for cleaning the wheels.

2. The cleaning apparatus of claim 1 wherein the cleaning material is a rough rubber material.

3. The cleaning apparatus of claim 2 wherein the supporting means (16) is located below the surface supporting the car.

4. The cleaning apparatus of claim 3 wherein the supporting means is arranged to maintain a low vacuum for removing dust.

5. The cleaning apparatus of claim 4 including a brush (39, 40) mounted on the supporting means (16) for removing dust from the belt.

6. The cleaning apparatus of claim 3 wherein third and fourth rollers are located below the first and second rollers respectively.

7. The cleaning apparatus of claim 6 wherein the support (11) is mounted on the supporting means (16).

8. The cleaning apparatus of claim 6 wherein the support is formed in two parts to Provide a central entryway for maintenance personnel to access the cleaning apparatus for inspecting and changing the belts.

9. The cleaning apparatus of claim 8 wherein the means for driving the rollers comprises an electric motor (35) connected to drive the first roller.

10. The cleaning apparatus of claim 9 wherein the electric motor is attached to the support (11).

11. The cleaning apparatus of claim 10 including a pad (17) located below the supporting means for isolating the car from vibration.

* * * * *